(12) United States Patent
Yamaguchi et al.

(10) Patent No.: US 6,377,322 B2
(45) Date of Patent: *Apr. 23, 2002

(54) LIQUID CRYSTAL DISPLAY DEVICE HAVING SPONTANEOUS POLARIZATION AND NO COMPENSATING CAPACITORS

(75) Inventors: Ikuhiro Yamaguchi, Tokyo; Hiromitsu Ishii, Hamura, both of (JP)

(73) Assignee: Casio Computer Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/218,282

(22) Filed: Dec. 22, 1998

(30) Foreign Application Priority Data

Dec. 29, 1997 (JP) .............................. 9-368611

(51) Int. Cl.[7] ............................ G02F 1/136; C09K 19/02
(52) U.S. Cl. ......................................... 349/42; 349/172
(58) Field of Search ........................... 349/42, 171, 172, 349/38, 39; 257/59, 72

(56) References Cited

U.S. PATENT DOCUMENTS

| 4,781,438 A | * 11/1988 | Noguchi | ..................... 349/42 |
|---|---|---|---|
| 5,012,228 A | * 4/1991 | Masuda et al. | ................ 349/42 |
| 5,457,553 A | * 10/1995 | Mori | ........................... 349/42 |
| 5,701,166 A | 12/1997 | Fedorovish et al. | .......... 349/38 |
| 6,078,368 A | * 6/2000 | Ichikawa et al. | ............. 349/42 |

* cited by examiner

*Primary Examiner*—William L. Sikes
*Assistant Examiner*—Tarifur R. Chowdhury
(74) *Attorney, Agent, or Firm*—Frishauf, Holtz, Goodman, Langer & Chick, P.C.

(57) ABSTRACT

Each pair of gate lines GL are arranged aside a corresponding one of rows of pixel electrodes arranged in a matrix form, so as to sandwich pixel electrodes in the direction of columns, whereas each pair of TFTs are arranged to a sandwich corresponding one of the pixel electrodes, and each of data lines DL is arranged aside a corresponding one of columns of pixel electrodes. TFTs are connected to the pixel electrodes and to the gate lines GL so that the pixel electrodes of one row are selected when two of the gate lines GL sandwiching the pixel electrodes are selected. An end of a current path of each TFT is connected to the data line DL. When a pair of TFTs sandwiching one pixel electrode are simultaneously turned on, large current is supplied to the pixel electrode through the data line DL. Source electrode of TFT and source electrode of its proximate (adjacent) thin film transistor are formed by patterning the same metal layer, and share one current path connected to the data line DL. A gate electrode of each of the TFTs is formed in integration with a part of the gate line GL.

11 Claims, 6 Drawing Sheets

LIQUID CRYSTAL DISPLAY DEVICE HAVING SPONTANEOUS POLARIZATION AND NO COMPENSATING CAPACITORS

BACKGROUND OF THE INVENTION

1. Field of the Invention

The present invention relates to a liquid crystal display device using liquid crystal which exhibits a ferroelectric phase when an electric field is applied thereto, and more particularly to a liquid crystal display device having a plurality of pixel capacitors each of which is driven by a plurality of TFTs (Thin Film Transistors).

2. Description of the Related Art

A TN (Twisted Nematic) TFT (Thin Film Transistor) liquid crystal display device is known. The TN TFT liquid crystal display device comprises a substrate on which pixel electrodes and TFTs connected to the pixel electrodes are arranged, a substrate on which a common electrode facing the pixel electrodes is provided, and a chiral nematic liquid crystal which is sealed between these substrates. An alignment of liquid crystal molecules of the liquid crystal is controlled by an interaction between dielectric anisotropy $\Delta\epsilon$ of the liquid crystal and an electric field applied to the liquid crystal.

The TFT liquid crystal display device has been used as a flat-type display device, since its response speed is comparatively fast and a quite high degree of a contrast can be obtained.

The liquid crystal molecules of the TN liquid crystal display device are aligned in a twisted homogenous alignment state in which the liquid crystal molecules are twisted between the substrates and their long axes are aligned almost parallel to the substrates, in a state where no electric field is applied between the substrates. Alternatively, the liquid crystal molecules are aligned in a homeotropic alignment state in which the liquid crystal molecules are aligned almost perpendicular to the substrates, in a state where a sufficiently strong electric field is applied between the substrates.

The TN liquid crystal display device has a problem that the view angle of it is narrow, because such a device displays an image using optical changes corresponding to changes in orientations of the molecules between the homogeneous and homeotropic alignment states in accordance with the intensity of the applied electric field.

For the TN TFT liquid crystal display device, the ratio of the capacitance of a parasitic capacitor between a gate electrode and a source electrode of each TFT to the pixel capacitor which is formed of a pixel electrode, the common electrode and the liquid crystal interposed between these electrodes is large, thus, there is a fluctuation in a voltage of the pixel electrode due to an effect of a gate signal applied to the gate electrode.

To limit the fluctuation, compensating capacitors are connected in parallel to the pixel capacitors.

The formation of the compensating capacitors makes the manufacturing process of the liquid crystal display device complicated. Further, electrodes forming the compensation capacitors cover portions of the pixels so that the aperture ratio of the liquid crystal display device becomes small.

Also well known is a TFT liquid crystal display device, using a chiral smectic liquid crystal having spontaneous polarization, and which exhibits a ferroelectric phase upon the application of an electric field, such as a ferroelectric liquid crystal or an antiferroelectric liquid crystal. This type of liquid crystal display device can operate at a high speed, because the liquid crystal molecules of the liquid crystal are driven by an interaction between the spontaneous polarization and the applied electric field. Because the liquid crystal molecules are driven to vary their directions on an imaginary plane parallel to the substrates, a wide view angle can be obtained.

The ferroelectric liquid crystal or the antiferroelectric liquid crystal has a large spontaneous polarization, and the spontaneous polarization is aligned in one direction in response to the applied electric field. Therefore, the capacitance of the pixel capacitors, which is formed of the pixel electrodes, the common electrode and the chiral smectic liquid crystal having the spontaneous polarization and interposed between these electrodes, is large. In order to charge and discharge the large pixel capacitors, large driving currents and TFTs tolerating such large driving currents are required. To allow the TFTs to tolerate large currents, TFTs need to have large element areas. The effective areas of the pixels are lessened as the element areas of the TFTs expand, and the aperture ratio of the device becomes smaller accordingly.

SUMMARY OF THE INVENTION

The present invention has been made in consideration of the above, and an object thereof is to provide a liquid crystal display device with a large aperture ratio and comprising TFTs and a liquid crystal which has a spontaneous polarization and which exhibits a ferroelectric phase at least when an electric field is applied thereto.

In order to achieve the above object, according to the first aspect of the present invention, there is provided a liquid crystal display device comprising:

first and second substrates arranged opposing each other, each of the first and second substrates having the first and second surfaces, and the first surface of the first substrate facing the second surface of the second substrate;

a plurality of pixel electrodes arranged, in a matrix form in both directions of rows and columns, on the first surface of the first substrate;

a plurality of pairs of thin film transistors arranged on the first surface of the first substrate, each pair of the thin film transistors sandwiching a corresponding one of the pixel electrodes in the column direction, and a current path of each thin film transistor having a first end and a second end, and the first end of the current path being connected to a corresponding one of the pixel electrodes;

a plurality of gate lines formed on the first surface of the first substrate, each adjacent pair of gate lines being arranged between two of rows of the pixel electrodes, and parts of the plurality of gate lines serving as gate electrodes of the thin film transistors;

a plurality of data lines formed on the first surface of the first substrate, each data line being arranged aside a corresponding column of the thin film transistors and between two of columns of the pixel electrodes, and being connected to the second ends of the current paths of the thin film transistors of the corresponding column;

a common electrode facing the pixel electrodes and arranged on the second surface of the second substrate; and liquid crystal, having spontaneous polarization and sealed between the first substrate and the second substrate.

According to the structure above, each pair of TFTs are connected to the corresponding single pixel electrode so that a large current can be supplied to the pixel electrode via these two TFTs. The charging of the pixel capacitors is almost finished during a period of time for selecting each of the pixels. The liquid crystal display device comprising the liquid crystal which has the spontaneous polarization does not require compensating capacitors, because of the large pixel capacitors of the device, so that a satisfactory large aperture ratio can be obtained.

In each columns of the thin film transistors, the second ends of the current paths of two thin film transistors proximate to each other between rows of the pixel electrodes may be connected to the corresponding one of said the lines via a common lead electrode. According to this structure, the area shielded by the current path can be reduced, and the aperture ratio is larger than in that case where the current paths are separately connected to the data lines.

In this case, preferably, each of the thin film transistors comprises a gate electrode, a gate insulating film, and a semiconductor film, the gate electrode of each of the thin film transistors is formed of a part of the corresponding one of the gate lines, a gate insulating film is formed on the gate electrode, a semiconductor film is formed on the gate insulating film so as to face the gate electrode, the semiconductor film has a first end connected to a corresponding one of the pixel electrodes, and a second end connected to the corresponding one of the data lines via a common lead electrode.

In other words, parts of the gate lines serve as the gate electrodes, and the thin film transistors are arranged on the gate lines. According to this structure, an area covered by the current paths of the transistors can be reduced, and the aperture ratio can be increased.

Preferably, the liquid crystal is chiral smectic liquid crystal exhibiting a ferroelectric phase when an electric field is applied thereto.

The pixel electrodes are rectangular, and each of the thin film transistors is preferably formed along one of two shorter sides of the corresponding one of the pixel electrodes.

The liquid crystal display device may further comprise a gate driver, connected to the gate lines, for simultaneously applying a gate pulse to each adjacent pair of gate lines which are arranged between two of the rows of the pixel electrodes;

a data driver, connected to the data lines, for applying data signals representing display gradations of a selected row of pixel electrodes to the data lines in synchronized with the gate pulse.

According to the second aspect of the present invention, there is provided a liquid crystal display device comprising:

first and second substrates arranged opposing each other, each of the first and second substrates having the first and second surfaces, and the first surface of the first substrate facing the second surface of the second substrate;

a plurality of pixel electrodes, each having a rectangular shape, and arranged in a matrix form in both directions of rows and columns on the first surface of the first substrate;

a plurality of pairs of thin film transistors arranged on the first surface of the first substrate, each pair of thin film transistors sandwiching corresponding one of the pixel electrodes in the column direction, a current path of each thin film transistor having a first and a second end, and the first end of the current path being connected to corresponding one of pixel electrodes;

a plurality of gate lines for supplying a gate signal to gate electrodes of the thin film transistors, the gate lines being formed on the first surface of the first substrate, each of the gate lines corresponding to one of rows of thin film transistors and being arranged between two of rows of the pixel electrodes;

a plurality of data lines formed on the first surface of the first substrate, each data line being arranged aside a corresponding column of the thin film transistors and between two of columns of the pixel electrodes, and being connected to the second ends of the current paths of the thin film transistors of the corresponding column;

a common electrode opposing the pixel electrodes and arranged on the second surface of the second substrate;

liquid crystal sealed between the first substrate and the second substrate, for forming pixel capacitors by the pixel electrodes and the common electrode, the pixel capacitors having a large capacitance than that of a capacitor arranged between the one end of the current path of each thin film transistor, and the electrodes.

The liquid crystal is preferably smectic liquid crystal having at least smectic layers in which liquid crystal molecules comprise dipole moments in a direction perpendicular to a long axis thereof, and liquid crystal molecules are obliquely aligned toward a normal line of the smectic layer.

Preferably, the liquid crystal has a helical structure of molecules and is made of ferroelectric liquid crystal which has a chiral smectic C phase exhibiting a ferroelectric phase or antiferroelectric liquid crystal which has a chiral smectic CA phase exhibiting an antiferroelectric phase in a state where the liquid crystal is provided between the first and second substrates.

Preferably, the pixel electrodes are rectangular, and each of the thin film transistors is formed along one of two shorter sides of the corresponding one of the pixel electrodes.

DETAILED DESCRIPTION OF THE PREFERRED EMBODIMENT

A liquid crystal display device according to one embodiment of the present invention will now be described with reference to the accompanying drawings.

Figure 1:
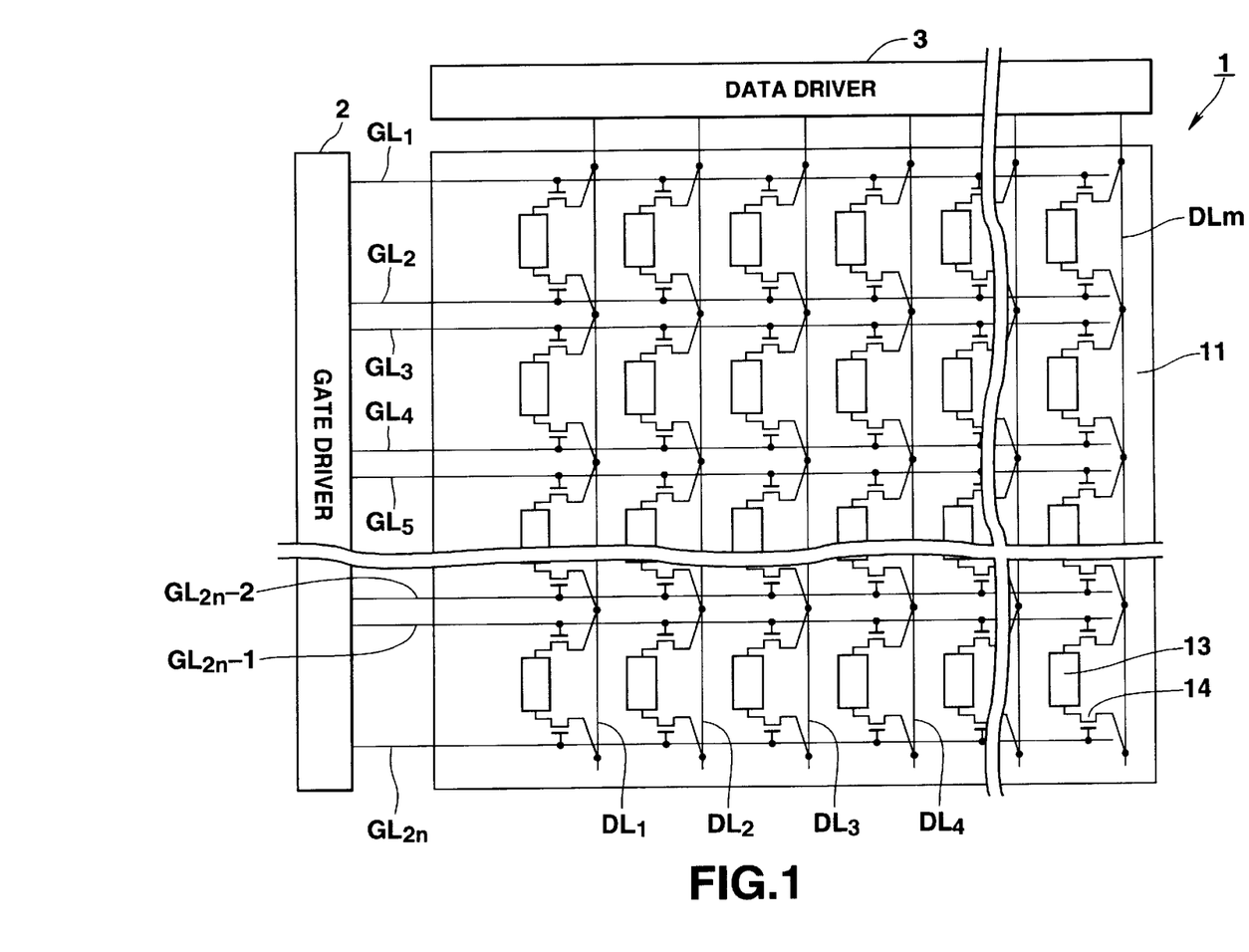
FIG. 1 is a diagram for explaining the structure of a liquid crystal display device according to one embodiment of the present invention.

The liquid crystal display device includes a liquid crystal display panel 1, a gate driver 2, and a data driver 3, as shown in FIG. 1.

Figure 2:
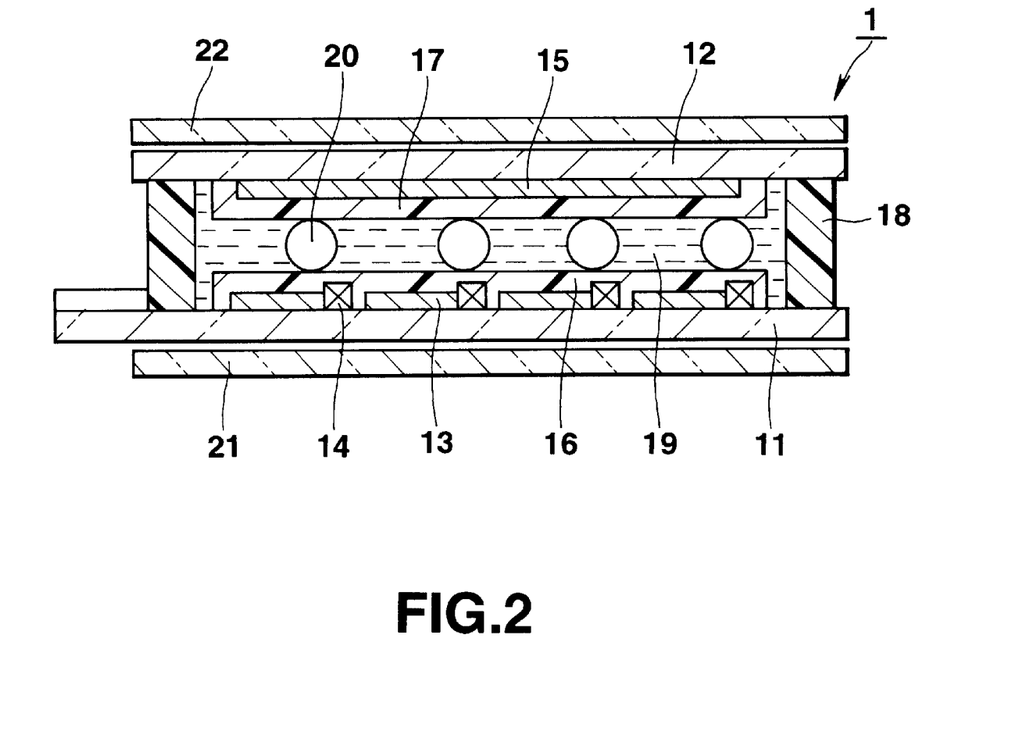
FIG. 2 shows a cross section for explaining the structure of the liquid crystal display device shown in FIG. 1.

The liquid crystal display panel 1 has a pair of transparent substrates 11 and 12 which are arranged to oppose each other, with spacers 20 in between, as shown in FIG. 2. The transparent substrates 11 and 12 are glass substrates or the like.

In FIG. 2, a plurality of pixel electrodes 13 are arranged on the lower-side transparent substrate 11 (hereinafter referred to as "lower substrate") in a matrix form of "n" rows and "m" columns. Each of the pixel electrodes 13 has the shape of rectangle arranged with its two longer sides vertical on the display screen as shown in FIG. 1. The pixel electrodes 13 are made of a transparent conductive material such as an ITO or the like.

Pairs of TFTs 14 (Thin Film Transistor) are arranged so that the TFTs 14 of each pair sandwich one of the pixel electrodes 13. In other words, the TFTs 14 of each pair are located one next to each shorter side of the corresponding rectangular pixel electrode 13.

The source electrode(the first end of a current path) of each TFT 14 is connected to its corresponding pixel electrode 13.

Each pair of gate lines GL (GL1 to GL2n) are arranged between the corresponding two rows of the pixel electrodes, so as to extend along the shorter sides of the pixel electrodes 13 arranged in matrix form. The gate electrodes of the TFTs 14 in each column are all connected to the corresponding gate line GL.

Data lines DL (DL1 to DLm) are arranged between the columns of the pixel electrodes 13 and extend along the longer sides of the pixel electrodes 13. A drain electrode(the second end of the current path)each TFT 14 and the drain electrode (the second end of the current path )of its proximate (adjacent) TFT 14 in the direction of the columns are commonly connected to its corresponding data line DL via a common path (lead electrode).

Figure 3:
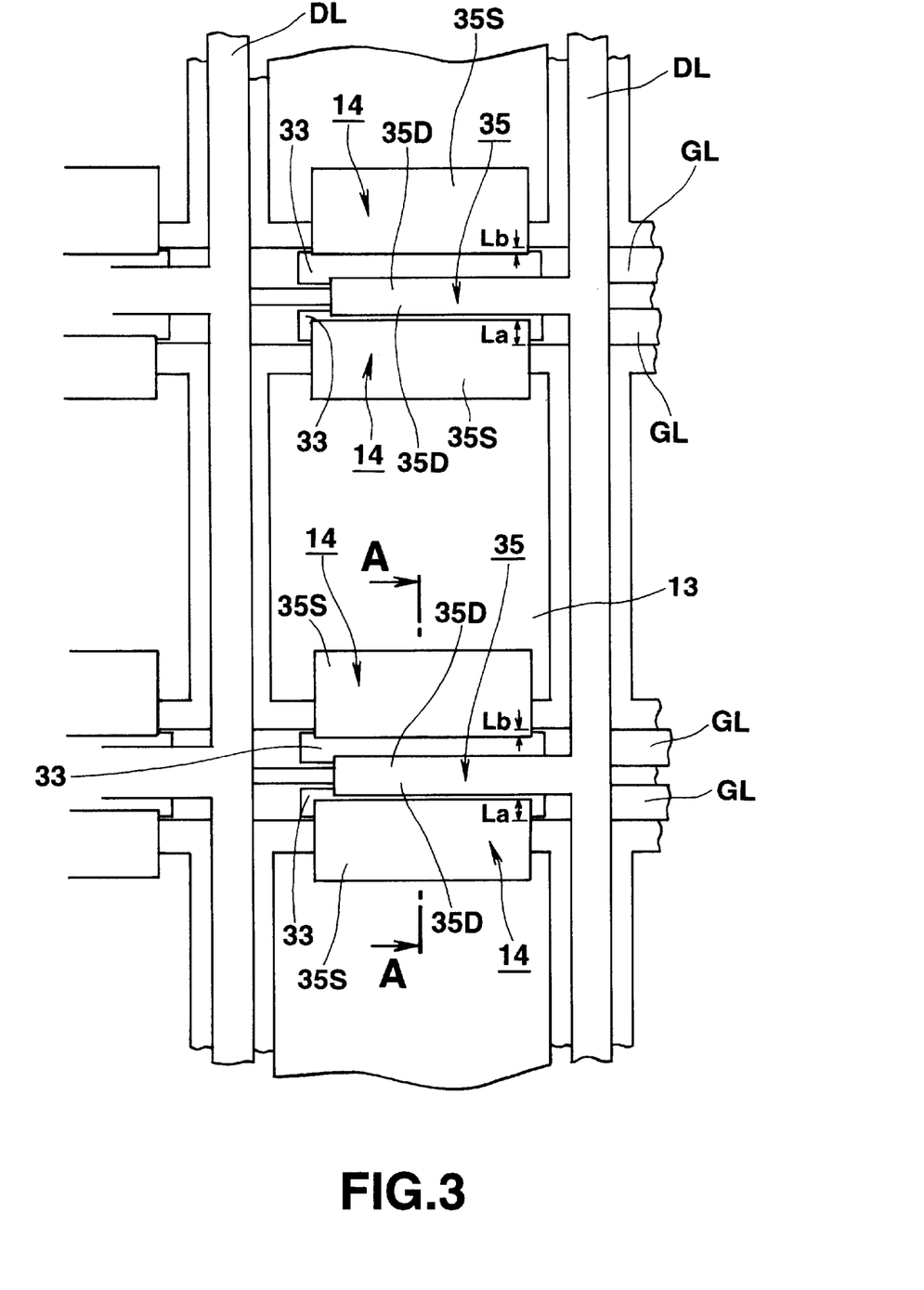
FIG. 3 shows an enlarged plan view of a lower substrate shown in FIG. 1.

Each of the TFTs 14 is formed on the corresponding one of gate lines GL as shown by the enlarged view illustrated in FIG. 3.

Channel regions of the TFTs 14 are made of semiconductor films. The channel region of each of the TFTs 14 is arranged over that part of the corresponding gate line GL which serves as a gate electrode of the TFT 14.

The width (in the horizontal direction in FIG. 3) of the channel regions is substantially equal to the length of the shorter sides of the pixel electrodes 13 and is satisfactorily larger than the channel length (in the vertical direction in FIG. 3). Therefore, the TFTs 14 have a large current-drive ability allowing a large current to flow therethrough. One end of a source electrode 35S of each of the TFTs 14 is connected to its corresponding pixel electrode 13, while the other end thereof is connected to the semiconductor film arranged over the gate line GL.

Lead electrodes 35 are formed between the corresponding rows of the pixel electrodes 13 so as to be connected to the corresponding data lines DL which are arranged between the columns of the pixel electrodes 13 and which extend along the columns. A part of each lead electrode 35 serves as a common drain electrode 35D of the proximate (adjacent) TFTs 14 which are placed between corresponding two pixel electrodes 13 placed in the column direction. The drain electrode 35D, the source electrodes 35S, the lead electrodes 35 and the data lines DL are formed by the same manufacturing process of patterning metal layers with the photolithography technique.

Figure 4:
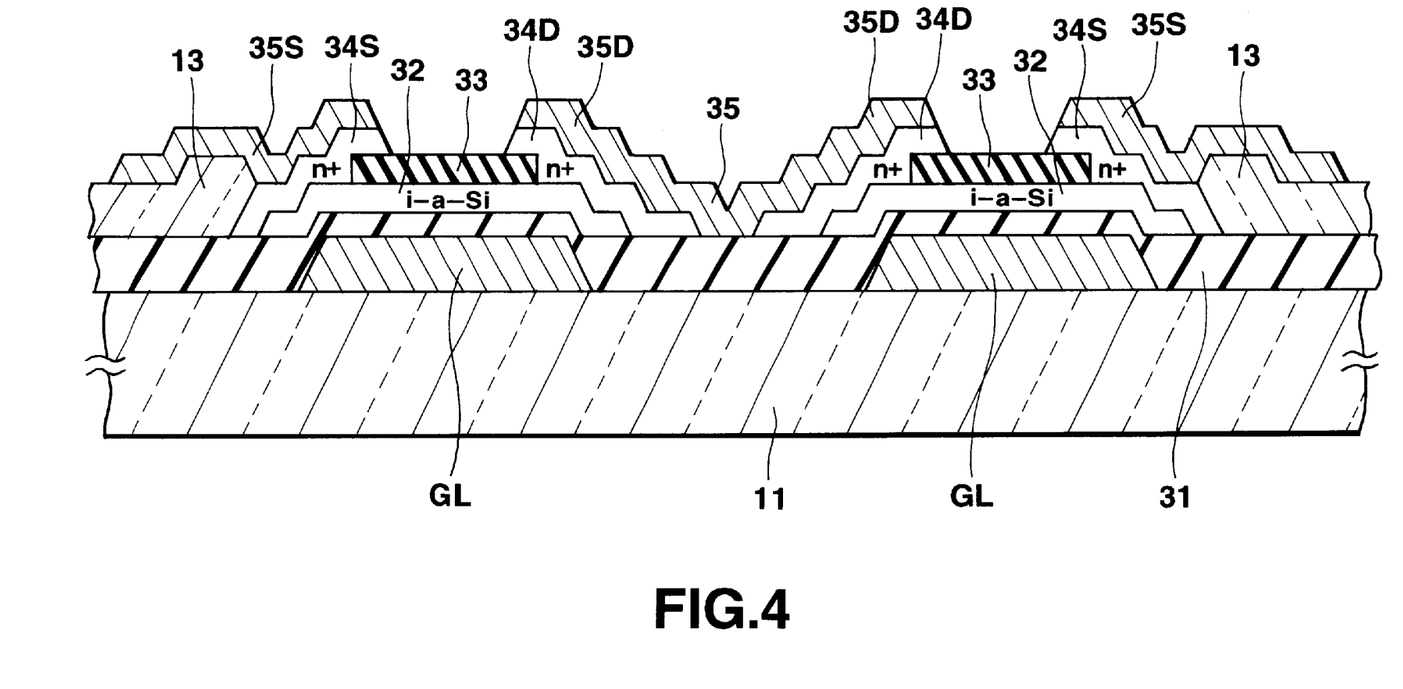
FIG. 4 is a diagram of a cross section taken along the line IV—IV shown in FIG. 3, for explaining the cross-sectional structure of a pair of thin film transistors.

The cross-sectional structure of the liquid crystal display device will now be explained with reference to FIG. 4. FIG. 4 is a cross section taken along the line IV—IV of FIG. 3.

As shown in FIG. 4, the gate lines GL which serve as gate electrodes of the TFTs 14 are arranged on the lower substrate 11. A gate insulating film 31 made of a nitride film ($Si_3N_4$) or the like is arranged on the gate lines GL.

A semiconductor layers 32 made of intrinsic amorphous silicon (i-a-Si), polycrystalline silicon or the like is formed on the gate insulating film 31 and over those portions of the gate lines GL which serve as the gate electrodes of the TFTs 14. Channel protective films 33 made of SiN or the like are formed on the channel region of the semiconductor layers 32. $n^+$ layers 34D including high concentration n-type impurities are formed on the drain side of the semiconductor layers 32, and $n^+$ layers 34S are formed on the source side of the semiconductor layers 32. The pixel electrodes 13 are close to or in contact with the source-side $n^+$ layers 34S. The source electrodes 35S cover parts of the corresponding pixel electrodes 13 and the source-side $n^+$ layers 34S, and electrically connect the pixel electrodes 13 to the TFTs 14. The lead electrodes 35 are formed on the drain-side $n^+$ layers 34D of proximate (adjacent) TFTs 14, and those portions of the lead electrodes 35 which are electrically connected to and overlap the corresponding $n^+$ layers 34D, serve as the drain electrodes 35D.

That is, the drain electrodes 35D of the adjacent TFTs 14 are integrated with the lead electrodes 35 and are connected to the data lines DL.

As shown in FIG. 2, a common electrode 15 is formed on an upper-side transparent substrate (hereinafter referred to as "upper substrate") 12. A common voltage is applied to the common electrode 15 which face the pixel electrodes 13.

An alignment layer 16 is arranged on an electrode formative surface of the lower substrate 11, whereas an alignment layer 17 is arranged on an electrode formative surface of the upper substrate 12. The alignment layers 16 and 17 are horizontal alignment layers made of an organic macromolecule compound such as polyimide or the like. Those surfaces of the alignment layers 16 and 17 which face each other are surfaces subjected to the alignment treatment by rubbing or the like.

The upper and lower substrates 11 and 12 are coupled by a sealing agent 18 at their peripheries, and liquid crystal 19 is sealed in the region surrounded by the substrates 11, 12 and the sealing agents 18.

The liquid crystal 19 is smectic liquid crystal having smectic layers and a spontaneous polarization such that liquid crystal molecules retain bipole moments in a direction perpendicular to the molecular long axis, and the liquid crystal molecules are aligned obliquely to the normal line of the smectic layers.

The liquid crystal 19 may be ferroelectric liquid crystal which has a chiral smectic C phase exhibiting a ferroelectric phase, or antiferroelectric liquid crystal which has a chiral smectic CA phase exhibiting a ferroelectric phase in a state wherein the liquid crystal is provided between the substrates, and the liquid crystal molecules have the helical structure in a bulk state.

A pair of polarizing films 21 and 22 for visualizing an optical change in the alignment state of the liquid crystal 19 are arranged on the external surfaces of the lower and upper substrates 11 and 12.

Figure 5:
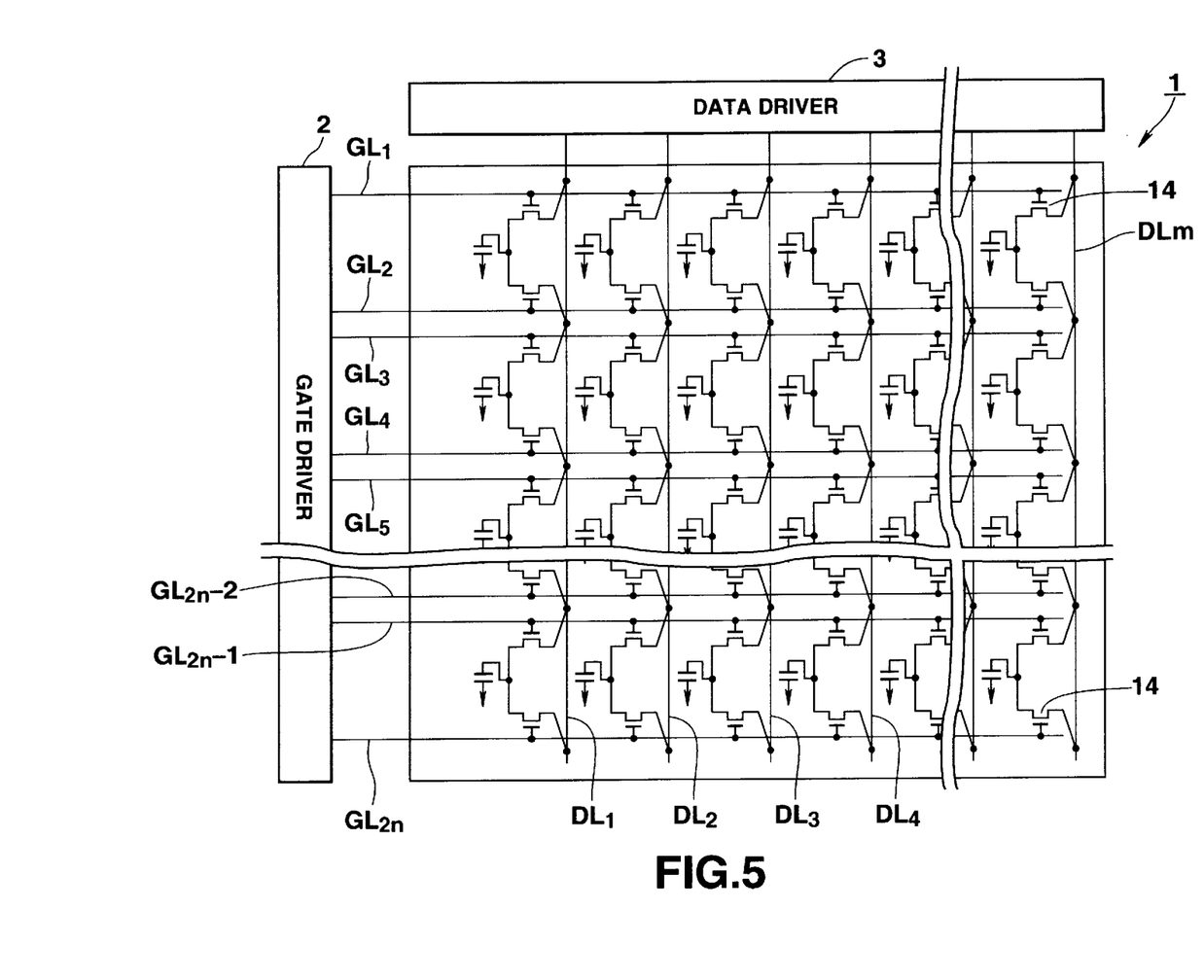
FIG. 5 is an equivalent circuit showing the liquid crystal display device.

Each of the pixels for displaying an image is formed of the polarizing films 21 and 22 and a pixel capacitor C which comprises the pixel electrode 13, the common electrode 15 and the liquid crystal 19 sealed between those electrodes 13 and 15. As shown in FIG. 5, each of the pixels, i.e., pixel capacitors C is connected to its corresponding data line DL via the current path (the source-drain path) of the TFTs 14. The liquid crystal 19 sealed between the substrates 11 and 12 retains the large spontaneous polarization, and accordingly the pixel capacitors C are large. The pixel capacitors C are satisfactorily larger in capacitance than a parasitic capacitor formed between the gate electrode and the source electrode 35S connected to the pixel electrode. The value of the pixel capacitor C is seven to ten times larger than that of the pixel capacitor of a conventional liquid crystal display device, and is at least twenty times larger than that of the parasitic capacitor. When a gate signal applied to the gate electrodes turns on, the small voltage, obtained by dividing the gate signal by the large pixel capacitor C and the parasitic capacitor, is applied to the source electrode 35S. Therefore, even a gate signal applied to the gate electrodes turns on, a fluctuation in a voltage of the source electrode 35S is small. Thus, there is no need to provide any compensating capacitor for preventing a fluctuation which occurs in the electrical potential of the pixel electrode due to the parasitic capacitor and the gate signal.

Figure 6A:
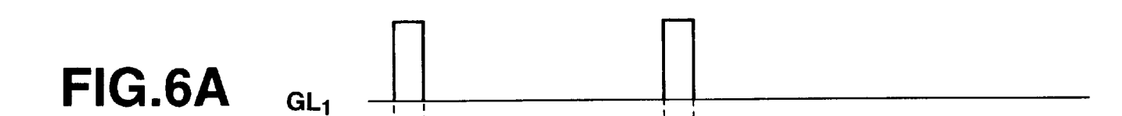
FIGS. 6A to 6G are timing charts for explaining gate signals.
Figure 6B:
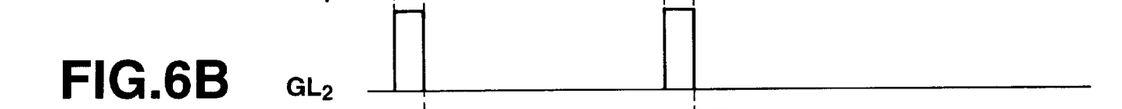
Figure 6C:
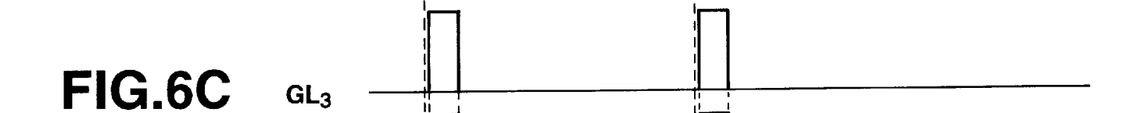
Figure 6D:
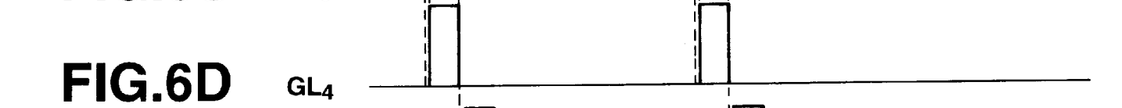
Figure 6E:
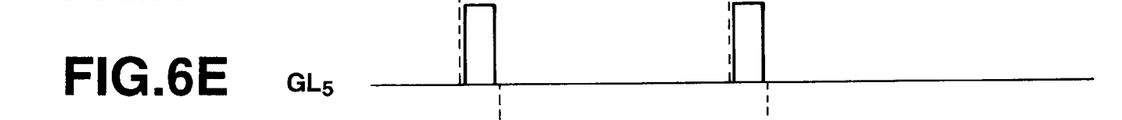
Figure 6F:
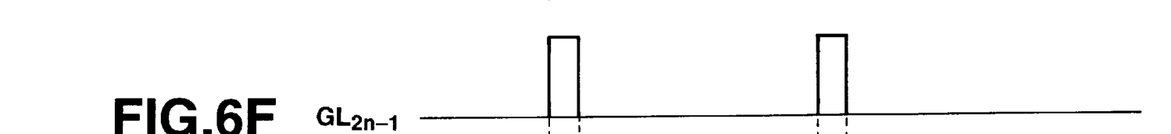
Figure 6G:
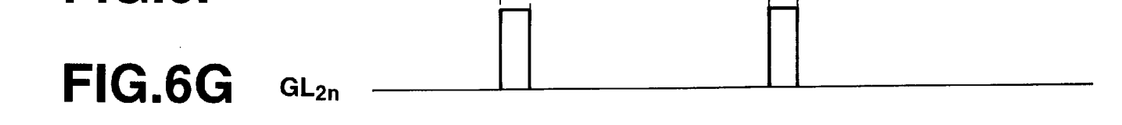

The gate driver 2 shown in FIG. 1 scans the gate lines GL by applying gate signals (pulses) sequentially to each pair of gate lines GL 2n-1 and GL2n as shown in FIGS. 6A to 6B. The gate lines GL 2n-1 are odd-numbered lines, while the gate lines GL2n are even-numbered lines. Each pair of gate lines GL2n-1 and GL2n sandwich a row of pixel electrodes 13.

A data driver 3 applies to each of the data lines DL a gradation signal having a voltage which corresponds to a display gradation of pixels of the selected row.

Operations of the TFT liquid crystal display device having the above-mentioned structure will now be explained by referring to FIGS. 1 to 6G.

The gate driver 2 simultaneously applies the gate signal to the pair of gate lines GL2n-1 and GL 2n, one being an odd-numbered line and the other being an even-numbered line, and turns on the TFTs 14 connected to the pixel electrodes 13 of the selected row as shown in FIGS. 6A to 6G. The data driver 3 supplies the gradation signal to each of the data lines DL almost coincidentally with the gate signal.

According to the above operation, the gradation signal is supplied to the selected pixel electrodes 13 through the data lines DL and the TFTs 14, which have been turned on, from the data lines DL. Due to this, the charging and discharging current of each of the pixel capacitors C is larger than in the case where a single TFT is used, so that each of the pixel capacitors C is satisfactorily charged and discharged within a predetermined selected period of time (during which the gate pulse is applied).

Further, the liquid crystal display device of this embodiment employs the ferroelectric liquid crystal or the antiferroelectric liquid crystal having the spontaneous polarization. As these types of liquid crystal have large spontaneous polarization, the pixel capacitor formed of the pixel electrode, the common electrode and the liquid crystal arranged between these electrodes are substantially large. Therefore, the parasitic capacitor between the gate electrode and the source electrode of the TFTs 14 is sufficiently smaller in capacitance than the pixel capacitor C. Only small fluctuation in the electrical potential of the pixel electrodes occurs, because the gate signal applied to the gate electrode gives only little effect on the electrical potential of the pixel electrodes 13 which are electrically connected to the gate electrode by the parasitic capacitor between the gate electrode and the source electrode. Thus, there is no need to arrange any compensating capacitor which is indispensable for the conventional TN-type TFT liquid crystal display device. Since the area in which two TFT elements are arranged is smaller than the area in which the compensating capacitor is formed, the aperture ratio of the liquid crystal device of the present embodiment is be larger than that of the conventional TN-type TFT liquid crystal display device.

Each of the TFTs 14 which includes a gate electrode or a part of the gate line GL is formed on the gate line GL, and the lead electrode 35 forming the drain electrode of the two adjacent TFTs 14 is formed in a non-display area of a boundary section between the pixels. Therefore, the area shielded by the TFTs 14 is smaller, and this results in the larger aperture ratio.

When the pairs of TFTs 14, each pair being connected to the corresponding one of pixel electrodes 13, cause an alignment deviation in the direction of the columns during a process of manufacturing, the parasitic capacitor (capacitor between the gate and the source electrodes) of one of two TFTs 14 becomes large in capacitance while the parasitic transistor of the other TFT 14 becomes smaller. In FIG. 3, for example, even if an overlapping length La between the source electrode 35S and the gate electrode (gate line GL) of one of the two TFTs 14 connected to the corresponding pixel electrode 13 placed there in between becomes small, as the result of the alignment deviation of a photomask, an overlapping length Lb between the source electrode 35S and the gate electrode of the other TFT 14 becomes large. Due to this, variations in the capacitance of the parasitic capacitors can be offset in terms of an entire pixel. A display irregularity, caused by a difference in the capacitances of the parasitic capacitors formed between the source and gate electrodes resulted from a difference in the extent of the overlapping areas in which source electrodes 35S and the gate electrodes GL of the TFTs 14 overlap each other, due to the alignment error of a mask in each exposure region subjected to divided exposures, can be removed, and its visibility in the alignment error can be improved.

The present invention is not limited to the above-described embodiments, and various modification and changes may be made. For example, in the above-described embodiment, each pair of TFTs are arranged aside the corresponding one of the pixel electrodes, however, three or more TFTs can be arranged instead. The TFTs can be arranged aside all four sides of the pixel electrodes having a rectangular shape, for example.

In the above-described embodiments, parts of the gate line GL serves as the gate electrodes of the TFTs, and the TFTs are formed on the gate lines GL . However, the gate electrodes can be formed so as to extend from the gate lines GL. The drain electrode 35D and the lead electrode 35 of the two adjacent TFTs 14 and the data line DL have been formed in integration with a same conductive layers. However, the drain electrode 35D, the lead electrode 35 and the data line DL can be formed from separate conductive layers.

What is claimed is:

1. A liquid crystal display device comprising:

first and second substrates arranged opposing each other, each of said first and second substrates having first and second surfaces, and the first surface of said first substrate facing the second surface of said second substrate;

a plurality of pixel electrodes arranged, in a matrix form of rows and columns, on the first surface of said first substrate;

a plurality of pairs of thin film transistors arranged on the first surface of said first substrate, each pair of said thin film transistors sandwiching a corresponding one of said pixel electrodes in the column direction, a current path of each thin film transistor having a first end and a second end, and the first end of the current path of each thin film transistor being connected to a corresponding one of said pixel electrodes;

a plurality of gate lines formed on the first surface of said first substrate, each adjacent pair of gate lines being arranged between two of the rows of said pixel electrodes, and parts of said gate lines serving as gate electrodes of said thin film transistors;

a plurality of data lines formed on the first surface of said first substrate, each data line being arranged aside a corresponding column of said thin film transistors and between two of the columns of said pixel electrodes, and each data line being connected to the second ends of the current paths of said thin film transistors of the corresponding column;

a common electrode facing said pixel electrodes and arranged on the second surface of said second substrate; and liquid crystal, having spontaneous polarization, sealed between said first substrate and said second substrate;

wherein no electrodes that oppose said pixel electrodes for forming capacitors are arranged on said first substrate; and whereby a plurality of respective pixel capacitors are formed by said pixel electrodes, said common electrode, and said liquid crystal, with no capacitors connected in parallel with said pixel capacitors being formed between said pixel electrodes and said common electrode.

2. The liquid crystal display device according to claim 1, wherein in each of the columns of the thin film transistors, the second ends of the current paths of two thin film transistors proximate to each other between the rows of said pixel electrodes are connected to a corresponding one of said data lines via a common lead electrode.

3. The liquid crystal display device according to claim 1, wherein:

each of said thin film transistors comprises a gate electrode, a gate insulating film, and a semiconductor film, the gate electrode of each of said thin film transistors is formed of a part of a corresponding one of the gate lines, the gate insulating film is formed on the gate electrode, the semiconductor film is formed on the gate insulating film so as to face the gate electrode, the semiconductor film has a first end connected to a corresponding one of said pixel electrodes, and a second end connected to a corresponding one of said data lines via a common lead electrode.

4. The liquid crystal display device according to claim 1, wherein said liquid crystal includes chiral smectic liquid crystal exhibiting a ferroelectric phase when an electric field is applied thereto.

5. The liquid crystal display device according to claim 1 wherein said pixel electrodes are rectangular, and each of said thin film transistors is formed along one of two shorter sides of the corresponding one of said pixel electrodes.

6. The liquid crystal display device according to claim 1, further comprising:

a gate driver, connected to said gate lines, for simultaneously applying a gate pulse to each adjacent pair of gate lines which are arranged between two of the rows of said pixel electrodes;

a data driver, connected to said data lines, for applying data signals representing display gradations of a selected row of said pixel electrodes to said data lines in synchronization with the gate pulse.

7. The liquid crystal display device according to claim 1, wherein said pixel capacitors have a capacitance having a value equal to or larger than twenty times a capacitance of a capacitor arranged between said gate electrodes and the first ends of the current paths of said thin film transistors.

8. A liquid crystal display device comprising:

first and second substrates arranged opposing each other, each of said first and second substrates having first and second surfaces, and the first surface of said first substrate facing the second surface of said second substrate;

a plurality of pixel electrodes, each having a rectangular shape, and arranged in a matrix form of rows and columns on the first surface of said first substrate;

a plurality of pairs of thin film transistors arranged on the first surface of said first substrate, each pair of said thin film transistors sandwiching a corresponding one of said pixel electrodes in the column direction, a current path of each thin film transistor having a first and a second end, and the first end of the current path of each thin film transistor being connected to corresponding one of said pixel electrodes;

a plurality of gate lines for supplying a gate signal to gate electrodes of said thin film transistors, said gate lines being formed on said first surface of said first substrate, and each of said gate lines corresponding to one of the rows of said thin film transistors and being arranged between two of the rows of said pixel electrodes;

a plurality of data lines formed on the first surface of said first substrate, each data line being arranged aside a corresponding column of said thin film transistors and between two of the columns of said pixel electrodes, and each data line being connected to the second ends of the current paths of said thin film transistors of the corresponding column;

a common electrode opposing said pixel electrodes and arranged on the second surface of said second substrate;

liquid crystal sealed between said first substrate and said second substrate;

wherein no electrodes that oppose said pixel electrodes for forming capacitors are arranged on said first substrate;

whereby a plurality of respective pixel capacitors are formed by said pixel electrodes, said common electrode, and said liquid crystal, with no capacitors connected in parallel with said pixel capacitors being formed between said pixel electrodes and said common electrode; and wherein said pixel capacitors have a capacitance having a value equal to or larger than twenty times a capacitance of a capacitor arranged between said gate electrodes and the first ends of the current paths of said thin film transistors.

9. The liquid crystal display device according to claim 8, wherein said liquid crystal is smectic liquid crystal having at least smectic layers in which liquid crystal molecules comprise dipole moments in a direction perpendicular to a long axis thereof, and the liquid crystal molecules are obliquely aligned toward a normal line of said smectic layers.

10. The liquid crystal display device according to claim 8, wherein said liquid crystal has a helical structure of molecules and is made of ferroelectric liquid crystal which has a chiral smectic C phase exhibiting a ferroelectric phase or antiferroelectric liquid crystal which has a chiral smectic CA phase exhibiting an antiferroelectric phase in a state where the liquid crystal is provided between said first and second substrates.

11. The liquid crystal display device according to claim 8, wherein each of said thin film transistors is formed along one of two shorter sides of the corresponding one of said pixel electrodes.

* * * * *